(12) United States Patent
    Barman et al.

(10) Patent No.: US 10,534,835 B2
(45) Date of Patent: *Jan. 14, 2020

(54) GLOBAL MEDIA LISTS FOR MOBILE DEVICES

(71) Applicant: Roovy, Inc., San Diego, CA (US)

(72) Inventors: Touradj Barman, San Diego, CA (US); Wyatt Webb, Beaverton, OR (US); Scott Webber, Toledo, OH (US)

(73) Assignee: ROOVY INC., San Diego, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 15/237,254

(22) Filed: Aug. 15, 2016

(65) Prior Publication Data

US 2017/0097938 A1    Apr. 6, 2017

Related U.S. Application Data

(63) Continuation of application No. 13/972,054, filed on Aug. 21, 2013, now Pat. No. 9,501,477.

(Continued)

(51) Int. Cl.

| | |
|---|---|
| *G06F 16/00* | (2019.01) |
| *G06F 16/958* | (2019.01) |
| *G06F 16/40* | (2019.01) |
| *G06F 16/955* | (2019.01) |
| *H04N 21/231* | (2011.01) |
| *H04N 21/2743* | (2011.01) |
| *H04N 21/414* | (2011.01) |
| *H04N 21/443* | (2011.01) |
| *H04N 21/658* | (2011.01) |
| *H04N 21/8352* | (2011.01) |

(Continued)

(52) U.S. Cl.
    CPC ............ *G06F 16/958* (2019.01); *G06F 16/40* (2019.01); *G06F 16/955* (2019.01); *H04N 21/23109* (2013.01); *H04N 21/2743* (2013.01); *H04N 21/41407* (2013.01); *H04N 21/4431* (2013.01); *H04N 21/6581* (2013.01); *H04N 21/8352* (2013.01); *H04N 21/84* (2013.01); *H04N 21/25891* (2013.01)

(58) Field of Classification Search
    None
    See application file for complete search history.

(56) References Cited

U.S. PATENT DOCUMENTS

| | | |
|---|---|---|
| 5,696,961 A | 12/1997 | Briscoe et al. |
| 6,248,946 B1 | 6/2001 | Dwek |

(Continued)

OTHER PUBLICATIONS

Pash, How to Install Andriod on an IPhone in Six Easy Steps, Nov. 18, 2010, Lifehacker.

(Continued)

*Primary Examiner* — Bai D Vu

(57) ABSTRACT

Systems and methods are disclosed for sharing global lists of media content among multiple apps executing on various client devices. A global list can include a plurality of records for media, each of which can include pointers to media stored elsewhere, a unique identifier for the media, a list identifier for the media, and/or metadata for the media. The global list can be accessed, modified, shared, aggregated, organized, etc. using different apps. These different apps may include apps developed by different developers, apps produced by different companies, apps offered for download by different companies, apps that perform different functions, etc.

18 Claims, 11 Drawing Sheets

Related U.S. Application Data

(60) Provisional application No. 61/691,270, filed on Aug. 21, 2012.

(51) Int. Cl.
   *H04N 21/84*    (2011.01)
   *H04N 21/258*   (2011.01)

(56) References Cited

U.S. PATENT DOCUMENTS

| | | |
|---|---|---|
| 6,834,371 B1 | 12/2004 | Jensen et al. |
| 8,005,462 B2 | 8/2011 | Roy |
| 2006/0173974 A1 | 8/2006 | Tang |
| 2007/0044026 A1 | 2/2007 | Potter et al. |
| 2008/0005179 A1 | 1/2008 | Friedman et al. |
| 2009/0158155 A1 | 6/2009 | Quinn et al. |
| 2009/0222392 A1 | 9/2009 | Martin et al. |
| 2009/0265417 A1 | 10/2009 | Svendsen et al. |
| 2010/0076983 A1 | 3/2010 | Gates et al. |
| 2010/0325239 A1 | 12/2010 | Khedouri et al. |
| 2011/0196882 A1 | 8/2011 | Kesselman |
| 2012/0216296 A1 | 8/2012 | Kidron |
| 2012/0232681 A1 | 9/2012 | Mundy et al. |
| 2013/0086003 A1 | 4/2013 | Alsina et al. |
| 2013/0263049 A1 | 10/2013 | Lehtiniemi et al. |
| 2014/0018048 A1 | 1/2014 | Anand et al. |

OTHER PUBLICATIONS

IKonic Apps LLC, Outlook Web Email, Oct. 25, 2011, Apple.com.
Google, Gmail, Feb. 16, 2012, Apple.com.
Cardinal Blue, Pic Collage, May 16, 2012, Apple.com.
MyMedia, MyPaint Free, Dec. 18, 2009, Apple.com.
Crispin, Internet Message Access Protocol Version 4rve 1, Mar. 2003, https://www.ietf.org/.
Seong et al., PrPl: A Decentralized Social Network Infrastructure, ACM Workshop on Mobile Cloud Computing, 2010.

GLOBAL MEDIA LISTS FOR MOBILE DEVICES

CROSS REFERENCE TO RELATED APPLICATIONS

This application is a continuation of U.S. Non-Provisional patent application Ser. No. 13/972,054, entitled "Global Media Lists For Mobile Devices," filed Aug. 21, 2013, and claims the benefit of, U.S. Provisional Patent Application Ser. No. 61/691,270, entitled "Global Lists," filed Aug. 21, 2012, the entire disclosure of which is incorporated herein by reference for all purposes.

BACKGROUND

Mobile devices have become ubiquitous. Individuals often access media via a mobile phone, tablet and/or computer. Apps executing on mobile devices allow clients to create, access, and/or manage media content. These apps can include native apps running on platforms like iOS, Android, Windows Phone, Blackberry, etc. Favorites or favorite lists are essentially bookmarks of content (similar to that used on websites) that clients may encounter in an app. In the most basic form of storing favorites, an app allows a client to store a favorite item, e.g., by simply storing it locally on the device. When a favorite is stored locally on a device, the client can go back to their device and access the favorite item whenever they're using their device. For example, a web browser may save bookmarks that point to specific websites or URLs rather than an individual piece of media.

SUMMARY

Embodiments of the invention are directed toward global media lists that include a plurality of media links accessible by more than one app. Various embodiments of the invention are described herein. For instance, one embodiment includes a method for receiving, at a server from a first client application executing on a client device, a first media link to media, a first user identifier, and an indication of a media list where the first media link will be stored; organizing in a database at the server the first media link in the media list; receiving, at the server from a second client application, the first user identifier along with a request for one or more media lists associated with the first user identifier; and sending, from the server to the second client application, the one or more media lists associated with the user identifier. The media list can be associated with the user identifier. The first media link can point to an image, music, video or a document stored on a server. In some embodiments, the second client application is a different application than the first client application, and/or each of the one or more media lists associated with the user identifier include one or more media links.

In some embodiments, the second client application executes on the client device. In some embodiments, the method can include creating, at the server, a unique identifier for the media associated with the first media link, and associating the unique identifier with the first media link in the media list. In some embodiments, the method can include receiving, at the server, a unique identifier associated with the media from the first application. In some embodiments, the method can include receiving metadata associated with the media from the first application; and organizing in the database at the server the metadata with the media in the media list.

In some embodiments, the method can include receiving an indication of the order of the first media link relative to other media links in the media list; and organizing the first media link in an order relative to other media links in the media list as specified by the indication of the order of the first media.

In some embodiments, the method can include receiving a request from the first application executing on the client device to create the media list prior to receiving the first media link. In some embodiments, the media list includes a media sub-list, and wherein the organizing the media into the media list includes organizing the media into the media sub-list.

In some embodiments, the method can include receiving a first identifier associated with the first client application from the first client application; and receiving a second identifier associated with the second client application from the second client application. In some embodiments, the method can include determining a plurality of clients associated with the media list; and sending the media list to the plurality of clients associated with the media list. In some embodiments, the method can include determining a plurality of client applications associated with the media list; sending a notification to the plurality of client applications associated with the media list specifying that the media list has been updated; receiving a request for the media list from a third client application that is one of the plurality of client applications; and sending the media list to the third client application.

Another embodiment includes a method for receiving, at a server from a first client application executing on a client device, media content, a user identifier, and an indication of a first media list where the media will be stored; storing the media content in a database at a server; associating a media link to the media content in the database at the server that can be used to retrieve the media content through a communication network; organizing in a database at the server the media link to the media in the first media list; receiving, at the server from a second client application, the user identifier along with a request for one or more media lists associated with the first user identifier; and sending, from the server to the second client application, the media lists associated with the user identifier. The second client application can be a different application than the first client application In some embodiments, the first media list can include a media sub-list, and wherein the organizing the media into the media list includes organizing the media into the media sub-list. In some embodiments, neither the first client application nor the second client application is a web browser applications.

Another embodiment includes a method for receiving, at a server from a first client application executing on a client device, a media link to media, a user identifier, and an indication of a first media list where the media will be stored; creating a unique identifier for the media; organizing in a database at the server the media link to the media and the unique identifier for the media in the first media list; receiving, at the server from a second client application, a request for the media associated with the unique identifier for the media, wherein the second client application is a different application than the first client application; and sending, from the server to the second client application, the media link to the media.

In some embodiments, the first media list includes a media sub-list, and wherein the organizing the media into the media list includes organizing the media into the media sub-list. In some embodiments, neither the first client application nor the second client application is a web browser application.

Another embodiment includes a method for maintaining in storage at a server a plurality of media lists where each media list of the plurality of media lists comprises a plurality of media links to media, a list identifier and a plurality of unique media identifiers; receiving at the server from a first app executing on a first mobile device a request for a first media list of the plurality of media lists; sending from the server to the first app executing on the first mobile device the first media list; receiving at the server from a second app executing on a second mobile device a request for the second media list of the plurality of media lists, wherein the second app is different than the first app; and sending from the server to the second app executing on the second mobile device the second media list.

In some embodiments, neither the first app nor the second app is a web browser application. In some embodiments, the first mobile device and the second mobile device comprise the same mobile device. In some embodiments, the first mobile device and the second mobile device comprise different mobile devices. In some embodiments, the first media list and the second media list comprise different media lists. In some embodiments, the first media list and the second media list comprise the same media list. In some embodiments, a first media link of the plurality of media links link to media in the first media list points to an image, music, calendar, document, or a video and a second media link of the plurality of media links link to media in the first media list points to media different than the media pointed to by the first media link.

Another embodiment of the invention includes a system having a database; a communication interface; and a processor communicatively coupled with the database and the communication interface. The process can be configured to maintain a plurality of media lists within the database, wherein each media list of the plurality of media lists comprises a plurality of media links, a list identifier and a plurality of unique media identifiers associated with each of the plurality of media links; receive from a first app executing on a first mobile device a request for a first media list of the plurality of media lists; send the first media list to the first app executing on the first mobile device; receive from a second app executing on the first mobile device a request for the first media list of the plurality of media lists, wherein the second app is a different and an independent app from the first app; and send the first media list to the second app executing on the second mobile device.

In some embodiments, neither the first app nor the second app are web browser apps. In some embodiments, the processor can be further configured to: receive from a third app executing on a second mobile device a request for the first media list of the plurality of media lists, wherein the third app is a different and an independent app from at least one of the first app and the second app; and send from the server to the third app executing on the second mobile device the first media list.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
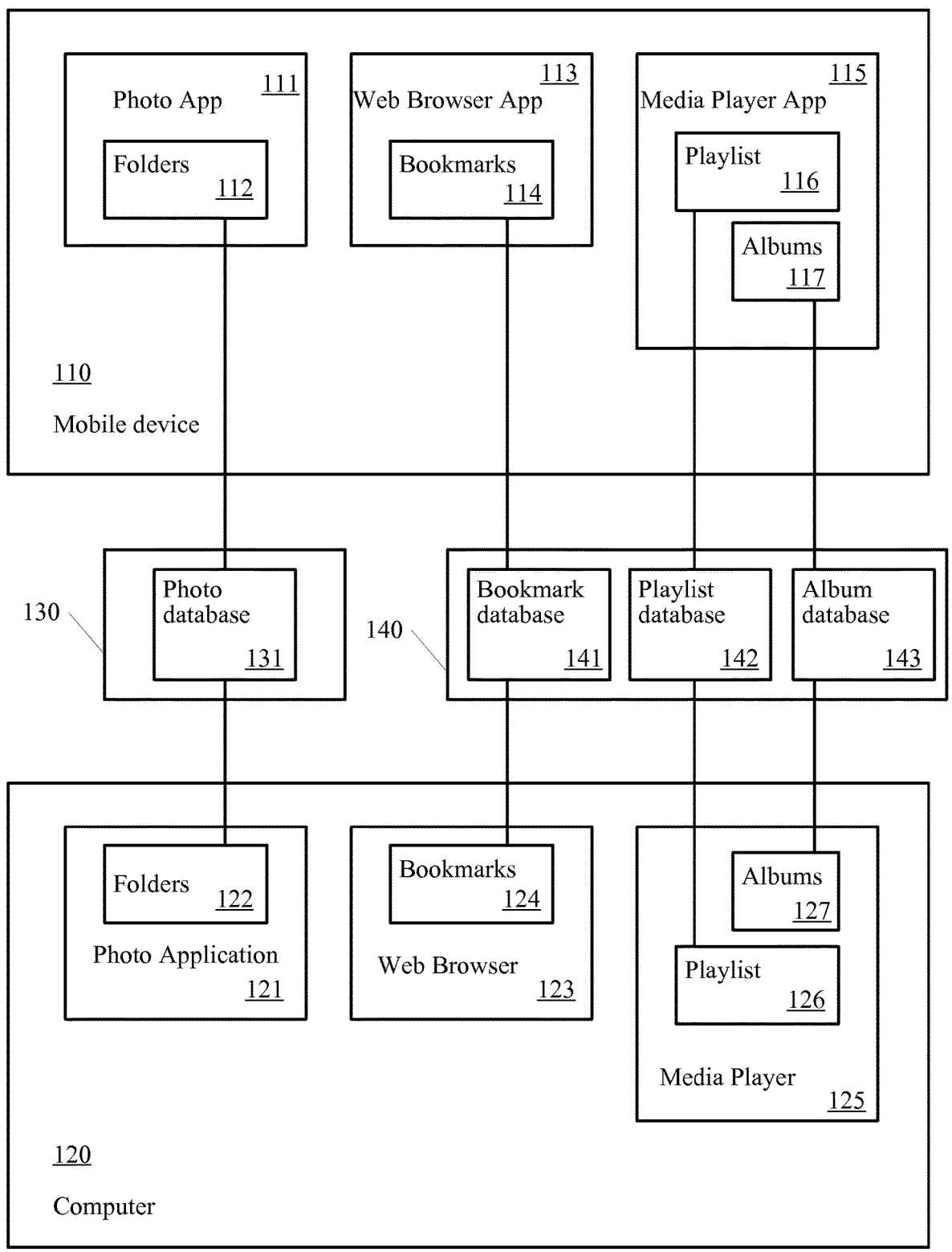
FIG. 1 shows a block diagram of apps interacting independently with different databases.

Systems and methods are disclosed to create, aggregate, manage, and publish global lists of media among various apps or applications executing on one or more computing device. These global lists can be accessed from multiple different apps in various ways.

Application software for mobile devices, often referred to as an app, allow clients to create and manage favorite lists or global lists. Apps can run on platforms like Apple's iOS operating system, Google's Android operating system, a Microsoft Windows device, a Blackberry device, etc. A global list is essentially bookmarks of media content (similar to that used on websites) that clients may encounter in a number of different apps.

In the most basic form of storing favorites, an app allows a client to store a global list, e.g., by simply storing it locally on the device. When a favorite list is stored locally on a device, the client can go back to their device and access the favorite item whenever they're using their device. However, the client cannot go to another device, mobile or otherwise (like a desktop or notebook computer or television) and also access the favorite.

Some apps store clients' favorite lists on a server instead of or in addition to storing it on a device, which offers many benefits, including the ability to access, store and edit the same favorite list from multiple devices. However, the favorite is still generally limited to access via that particular product or family of products. For example, if a company has an iPhone app and lets you store a favorite on the iPhone app, you may be able to access the same favorite item on that company's Android app or on their website, but via their service only. In other words, the global list cannot be accessed outside of an app or website of the same title and/or brand.

In some embodiments, a plurality of different, independent, dedicated apps can access the same media content via the global list. Different, independent, dedicated apps may include apps developed by different developers, apps produced by different companies, apps offered for download by different companies, apps that perform different functions, etc. Different, independent, dedicated apps are apps that are not web browsers.

Moreover, different, independent, dedicated apps executing on mobile devices do not share network connected databases with one another. While different, independent, dedicated apps executing on a mobile device may share media with different databases on the same server and/or with different applications executing on a computer, these apps do not share media between different, independent, dedicated apps via a single database (or list).

In addition to supporting all of these methods, embodiments of the invention allow clients to store media content, which may include favorite items, from different apps, sites or services in a global list and provide access to them from any other app, site or service.

In some embodiments, a server can store a global list of media items or media content, generally and independently. This server can run separate of any particular company's app, so that many different apps and/or services, particularly from different developers and/or vendors, can share the media items and/or the media content in the global list.

In some embodiments, a system on a server may be maintained that lets clients create accounts and store and maintain global lists associated with those accounts. For example, a client can log into an account via App A; connect to the global list service; and add, access, modify and share their media items, media content, and/or global lists through App A. The same may be achieved by the client or a different client through App B. App A can be a different and/or independent app from App B and may not be a web browser app. That is, App B can be made by another company than App A. As another example, App B can perform a similar function as the library and/or App B can be an app created by a third-party developer to operate similarly and/or interface with the global lists server or service.

This service and overlapping or related or similar services and/or capabilities may also be referred to or referenced as the global list service. One way that these and related and/or similar features and capabilities can be available or accessed is via a button or other access method that, or similar to which, can exist in many different apps, platforms, devices, environments, etc. A global list account can be associated with a client and can be used as a global service across apps, services, websites, devices, computers, platforms, etc. for the provision of multiple additional services, some of which are detailed in this document.

FIG. 1 provides an example of apps operating independently with various different databases as is common in the art. The figure shows mobile device 110 and computer 120 in communication with server 130 and server 140. Mobile device 110 can include any type of mobile device including, for example, a mobile phone, a smart phone, a tablet, an electronic reader, etc. Computer 120 can include any type of computer including, for example, a laptop, desktop, television, etc. Applications executing on mobile device 110 and applications executing on computer 120 can share data via server 130 and server 140.

For example, photo application 121 executing on computer 120 may operate on photographs stored and/or organized in folders 122 within the application. Similarly, photo app 111 executing on mobile device 110 may include photographs stored and/or organized in folders 112. Photographs in folders 112 and folders 122 can be shared between photo application 121 executing on computer 120 and photo app 111 executing on mobile device 110 via photo database 131 maintained on server 130. In some instances, photographs can be automatically shared between mobile device 110 and computer 120 when new photographs are taken and/or stored in folders 112 and/or folders 122. In this way, all of a client's photographs, whether captured or saved on mobile device 110 and/or computer 120 can be shared between devices.

As another example, web browser 123 executing on computer 120 may include bookmarks 124. Similarly, web browser app 113 executing on mobile device 110 may include bookmarks 114. Bookmarks 114 for web browser app 113 can be shared with web browser 123 and bookmarks for web browser 123 can be shared with web browser app 133 via bookmark database 141 on server 140. In this way, all bookmarks, whether captured or saved on mobile device 110 and/or computer 120 can be shared between devices.

As another example, media player 125 executing on computer 120 may include songs or videos organized in playlists 126 and/or albums 127. Similarly, media player app 115 executing on mobile device 110 may include songs or videos organized in playlists 116 and/or albums 117. Songs or videos organized in playlists 116 and/or albums 117 on mobile device 110 can be shared with playlists 126 and/or albums 127 on computer 120 via playlist database 142 on server 140 and album database 143 on server 140 and vice versa. In this way, all songs and/or videos, whether captured or saved on mobile device 110 and/or computer 120 can be shared between devices.

As shown in FIG. 1, bookmark database 141, playlist database 142 and/or album database 143 can be hosted by server 140, which may be a single server or a plurality of related servers. Photo database 131 is hosted on server 130, which is distinct from server 140. While the various databases may be hosted in conjunction with one another, the separate databases may be in use. As shown, however, each app (e.g., photo app 111, web browser app 113, and media player app 115) executing on mobile device 110 shares data (or media) with a separate database on servers 130, 140.

The different apps executing on mobile device 110 do not share the same database even though the databases may be hosted on the same server. Instead, the various apps executing on mobile device 110 share media with separate and distinct databases. Indeed, a database does not share media with more than one app executing on mobile device 110.

For instance, photo database 131 may be hosted by a social networking company (e.g., Facebook®) and Photo App 111 may be a native Facebook® app executing on the mobile device. A user may access photos from photo database 131 via Photo App 111. The user may also log into their web account and access the photos in photo database 131 using web browser 123 from computer 120 via a web browser using the Facebook® website. Moreover, the user may also log into their web account and access the photos in photo database 131 from web browser app 113 via mobile device 110 via a web browser using the Facebook® website. Thus, a user can access one of the databases 131, 141, 142, and 143 via a single independent or dedicated app or a web browser on mobile device 110 and/or computer 120. But databases 131, 141, 142, and 143 can only be accessed from one independent, different, and/or dedicated app that is not a web browser. Furthermore, the global lists found in each of the databases are not shared among different, independent and/or dedicated apps.

Figure 2:
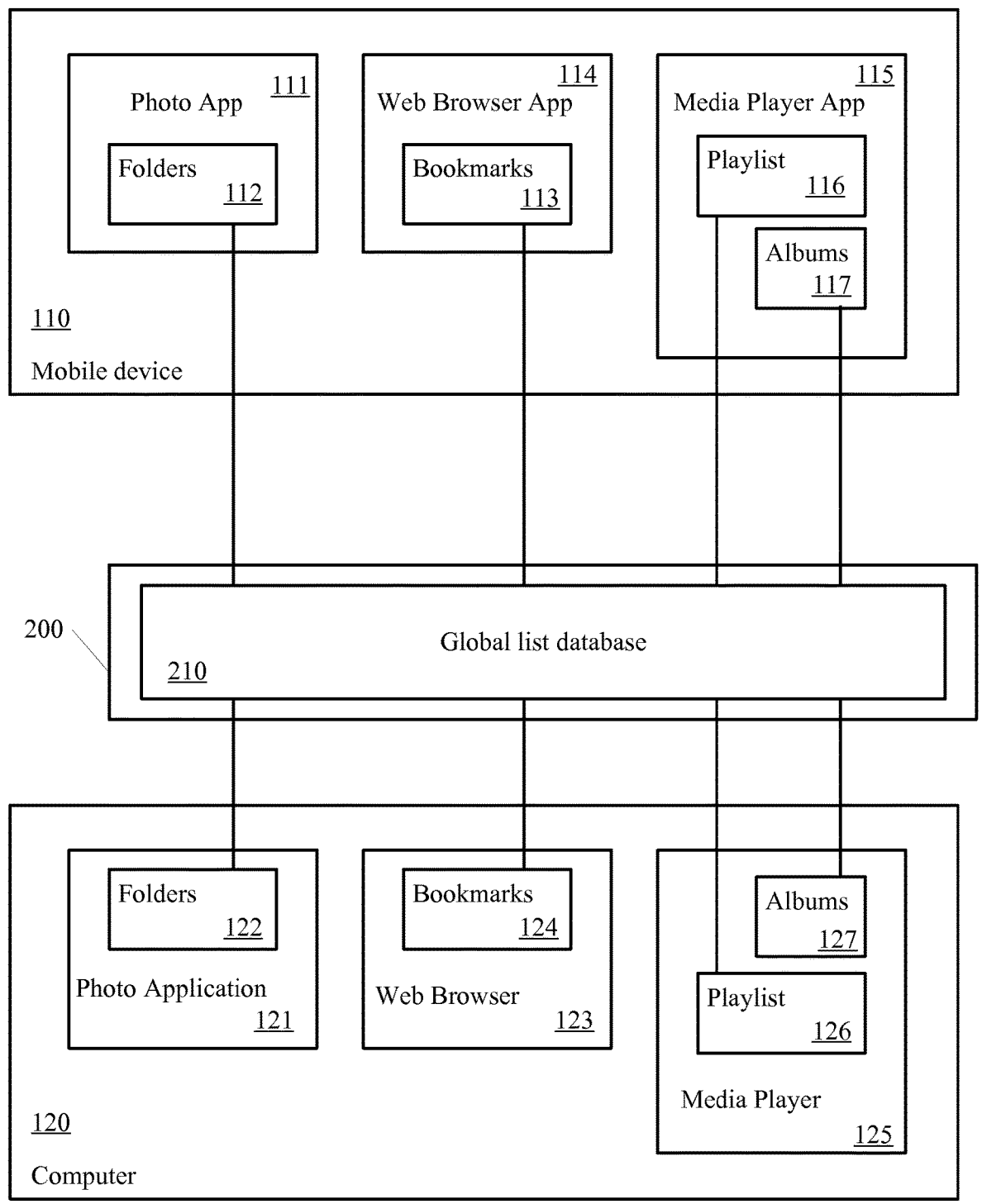
FIG. 2 shows a block diagram of a plurality of apps executing on a mobile device that share media via global list database on global list server according to some embodiments of the invention.

FIG. 2 shows a plurality of apps executing on mobile device 110 sharing media via global list database 210 on global list server 200 according to some embodiments of the invention. The combination of global list database 210 and global list server 200 can be considered a global list service by providing access to global lists stored in global list database 210 to various applications and apps.

As shown, photo app 111, web browser app 113, and media player app 115 executing on mobile device 110 can all connect with and/or share media with global list database 210. For instance, photo app 111, web browser app 113 and/or media player app 115 can share photographs, music, videos, bookmarks, etc. in folders 112, bookmarks 114, playlists 116 and/or albums 117 with each other, other apps and/or applications executing on computer 120. In this way, each app can connect, access, and/or share media with each other. Moreover, photo app 111 and media player app 115 are not web browser apps and/or may be different and/or independent from each other.

Mobile device 110 and/or computer 120 can connect with global list server 200 and/or global list database 210 via any network connection including wired and/or wireless connections. For example, these connections can include connection through various other servers, modems, interfaces, cell towers, etc.

Figure 3:
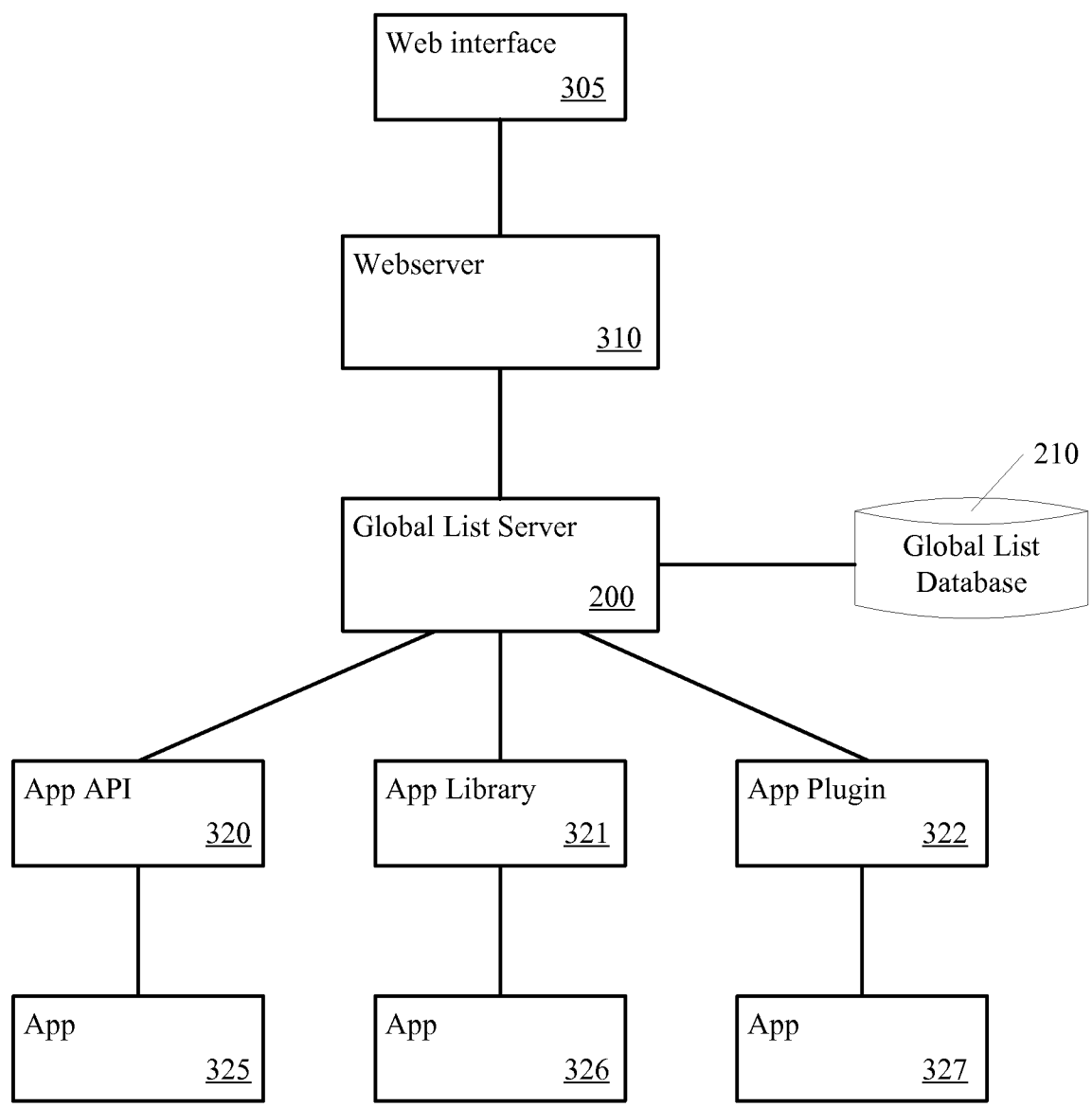
FIG. 3 is a block diagram showing a plurality of apps and web interface in connection with a global list server communicatively coupled with a global list database according to some embodiments of the invention.

FIG. 3 shows three independent, different and/or dedicated apps 325, 326, and 327 and web interface 305 (e.g., a web browser or the like) in connection with global list server 200 communicatively coupled with global list database 210 according to some embodiments of the invention. The independent and/or dedicated apps 325, 326, and 327 can each interoperate with global lists in global list server 2000 and/or each may not be a web browser app.

Global list database 210 is a database that associates media, a hyperlink to media, a media identifier, a username, a list identifier and/or a sub list identifier with each other. For example, a hypertext link to media or a URL referencing media stored at another server can be associated with a unique media identifier and a client within global list database 210. The media or URL referencing the media can also be associated with one or more client specified or created lists.

In some embodiments, global list server 200 can be coupled with global list database 210. In other embodiments, global list server 200 can include global list database 210. Regardless, global list server 200 can facilitate interface to media stored within global list database 210. Either or both global list server 200 and/or global list database 210 can include one or more servers and/or may operate in the cloud.

The following table is an example of the data that can be stored in global list database 210. This database includes a unique username, a hyperlink pointing to the media, the user name (or client ID) of the client owning the list, the name of the list (or a list identifier), the media type, and metadata associated with the list. Various other data types can be included in the table.

| UUID | Hyperlink | Username | List | Type | Metadata |
|---|---|---|---|---|---|
| d6e846f5-fa1d-453c-b2d8-5fa4cf192026 | http://upload.wikimedia.org/wikipedia/commons/5/55/Viceroy_Butterfly.jpg | BFlyLover9 | Butterflies | photo | Vicory butterfly photograph |
| 759909a5-2347-4ea8-92f3-88969e939f11 | http://upload.wikimedia.org/wikipedia/commons/3/3a/Meadow_Argus.jpg | BFlyLover9 | Butterflies | photo | Meadow Argus butterfly photograph |
| b1001588-d7b2-4c74-b222-76b431eff920 | http://upload.wikimedia.org/wikipedia/commons/6/65/Blue_morpho_butterfly.jpg | BFlyLover9 | Butterflies | photo | Blue Morpho butterfly photograph |
| 7f064114-f937-11e2-b778-0800200c9a66 | http://www.youtube.com/watch?v=stcdNj0SANw | BFlyLover9 | Butterflies | video | Mariah Carey music video |

The username may specify the client that uploaded the media. The metadata can include any type of comments or information about the media. The Type may indicate the type of media content such as video, image, music, or document. This can be helpful for an app to know what type of resource to use to view or interact with the media.

Various other data elements may also be included within the table such as, for example, a thumbnail image, a portion of a song, a portion of a video, the name of the media, etc. Additional information may also include an indicator specifying the order of media content in a list. This additional information may be saved independently on a third party server or as part of the metadata. In some embodiments, the global list may also indicate the security of the media content and/or whether the media content can be shared with other clients. In some embodiments, the global list may include the name or an indicator of the app that originated the media. In some embodiments, the global list may also indicate one or more sub-lists where the media can be found.

In some embodiments, app 325 can interface with global list server via app API 320. API, or application programming interface, 320 can be used by App 325 to access global list database 210 via global list server 200. API 320 can include software components, protocols, libraries, routines, data structures, object classes, and/or variables that App 325 can use to interface with global list database 210. For example, API 320 can specify the proper functions and/or routines used by App 325 to interface with global list database 210.

In other embodiments, app 326 can connect with global list server 200 via app library 321. App library 321 can include a software library that defines the functions used to interface with global list database. App library 321 can be accessed by a plurality of apps executing on mobile device 110. App library 321 can include functions that an App can use for adding content to a global list, deleting content from a global list, accessing specific content from the global list, accessing the entire list of content in the global list, accessing one or more sub lists of a global list, viewing content within a global list, organizing content within a global list, downloading content within a global list, etc.

In yet other embodiments, app 327 can interface with global list server 200 via app plugin 322. App plugin 322 can be a software component that provides access to global list database 210 via global list server 200.

In some embodiments, a client can access and/or interface with media in global list database 210 through a webpage hosted at webserver 310. For instance, a client can operate web interface 305 on a computer, tablet or mobile phone and connect with global list server 200 via the webpage hosted by webserver 310. Various libraries, plugins and/or APIs may be used by webserver to interface with global list server 200.

App API 320, app library 321 and/or app plugin 322 can make calls to global list server 200 or provide instructions for making calls to global list server in any number of ways. For example, to log in, an app may send a developer key that identifies either the developer or the app that is sending the information. The developer key may be a unique identifier that uniquely identifiers the developer of the app or the app itself. The app may also send the user's email address or user name and a password. Global list server 200 may return a success or failure notice. In some embodiments, a cookie can be sent if log in was successful.

As another example, to post media to a media list, the app may send an identifier for the list to which the media will be added, the name of the media to be added, a thumbnail of the media, an indication of the type of media (e.g., photo, video, audio, document, etc. or .jpg, .png, .ppt, .giff, .mpg., mp3, etc.), and/or the URL or the address where the media is located.

As an example, Client 1 operating App A on a client device can store a link to a media item. This link can be saved in their account on a global list server (or via federation on other, interconnected servers). Client 1 can then operate App B and store another link to a different media item in their account on the global list server. The bookmark to the media items can follow a form that may be understood by all participating apps and services. The client can then open App A, App B or any other supported app or service and access the link to the media item via App A and/or App B or for that matter any other supported app or service. Thus, Client 1 may access their global list in their general account independent of what app they currently operating (or even from other locations or sources, e.g. via the Web).

Figure 4:
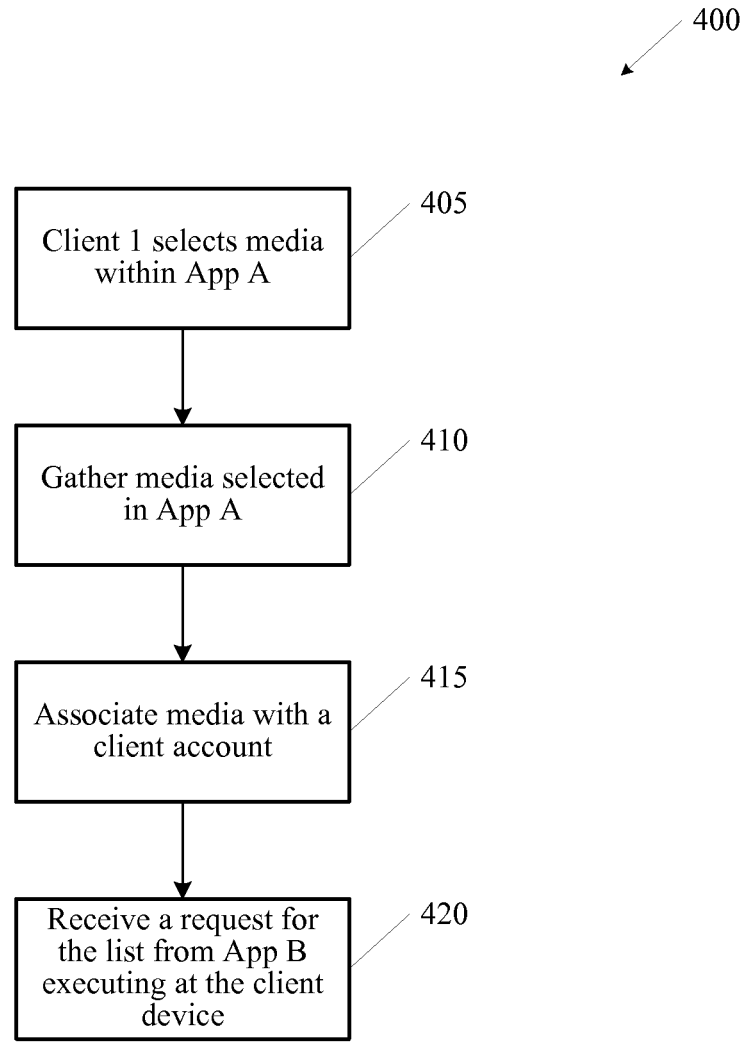
FIG. 4 is a flowchart of a process for using a global list according to some embodiments of the invention.

The proceeding example may follow the process 400 shown in FIG. 4. Process 400 begins at block 405 where client 1 selects media within App A. For example, Client 1 can select a portion of an app (e.g., mark on screen as a star or can be selected with highlighting). As another example, client 1 can select media from dropdown windows, or other file management service. As another example, App A may be divided into portions on the backend. For instance, the app developer or architect determines the portions that may be selected. As another example, Client 1 may select the portions of the app in real time using a smart selection tool (e.g., a tool that determines part of an app is being selected and is configured to generate e.g., a star associated with the selected portions). Various other media identification and/or selection techniques can be used.

At block 410, information that identifies the selected media (or portion of an app or a link to the media) can be then gathered (e.g., on the backend, all the "starred" portions are matched with the data content they refer to). The media or link to the media can be sent to global list server 210. In some embodiments, the media can be sent via an HTTP POST request.

At block 415, the media can be associated with a client account. In some embodiments, the information may be divided into lists, sub-lists, module, albums, and/or chapters, etc. which can also be ordered. The lists then, which can be named and ordered, are associated with a client account also and may be sharable/copy-able among other clients.

At block 420 the media can be stored in the global list database 210. In some embodiments, the information is stored as pointers, links, URLs, etc. to where the actual information is stored. In some embodiments, the request can be an HTTP GET request.

In some embodiments, certain items (e.g., starred items) may be grouped together. As an example, all songs saved in a global list may be grouped as "Music" and all video may be grouped as "Videos". Moreover, these groupings can be considered sub-lists, sub-groups, etc. In some embodiments, an app may offer recommendations to clients for saving items to their global list. The recommendations may be based on popularity of items, prior history of a particular client's interests, their friends, their friends' lists and/or usage, etc.

In some embodiments, a global list button may be integrated into apps that can interface with global list database 210, for example with App API 320, App Library 321, and/or app plugin 322. A global list button may incorporate access to the global list database. This service, for example, may be run by global list server 200 and can be universal and/or independent of the services run by the developers making their own apps to provide the primary functionality in their apps.

As another example, Client 1 can use App B that is independent and/or not associated with either global list server 200 and/or global list database 210 to select a media item and/or to mark the media item as a media favorite. To select the item, Client 1 can select a global list button or widget provided in App B's client interface. Client 1 can thereafter log into global list server 200 and/or global list database 210 (or is prompted to create an account first). Client 1 may then select a media item or mark it as a favorite from App B and have the media item stored in global list database 210.

Figure 5:
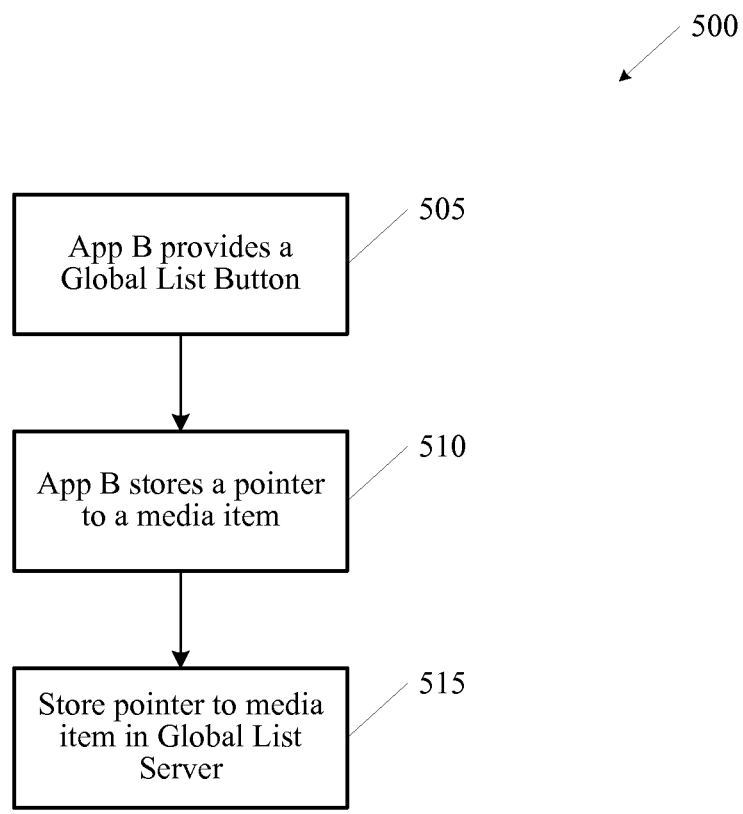
FIG. 5 is a flowchart of a process for using a global list button according to some embodiments of the invention.

The proceeding example may follow the process 500 shown in FIG. 5. Process 500 begins at block 505 where App B provides a way for clients to select media portions of App B or from within App B. At block 510, App B can provide a place to store a pointer (or link) to the selected media item. In some embodiments, the pointer can be sent to global list server via an HTTP POST request.

At block 515 the pointer or link to the media item is stored to global list database 210. In some embodiments, a server or host other than global list server 200 and/or global list database 210 may store the media content while global list database 210 stores links to the media content. In some embodiments, an app host or third-party host may store the media content so that the App can access the content. In other words, the global list widget may need to be able to point to content for a favorites list that is accessible. In some embodiments, for content that requires a password or is encrypted, the App (e.g., via the client's account or widget) may store an authorization code with a pointer or link on the server.

In some embodiments, the global list widget may allow a client to select a "global list button". Thereafter, the client may be presented with a global list from their account (e.g., after login). The global list or anything stored as part of the account may appear to take over the client's screen or a portion of the client's screen.

Embodiments of the invention can provide many functions and may or may not be accomplished using the techniques presented m this disclosure.

In some embodiments, in addition to creating a global list of media content (or favorite items), a client can create multiple lists, sub-lists, albums, chapters, etc. of media content. This may allow for better organization, such as creating lists themed to different topics.

The client can send their global list to another client to share their media content. The client can also receive another client's global list that has been shared with them. Similarly, the client can submit their global list to a public venue where is can be shared with the public or groups of other clients (e.g., by publicly posting the list file). The client can also browse and retrieve global lists that have been made available publicly or to groups.

For example, the client may decide to share a list with a friend. The client may select the list to share and indicate that he wishes to share the list (e.g., by selecting a share or send option from a pull-down menu). The friend may then be notified that the client has shared a list with him e.g., via an email to the friend. The friend may then be required to log into a global list account to access the shared list, which may be already populated in the friend's global list account.

In some embodiments, an app or server (e.g., global list server 200 or global list database 210) may keep track of who made a global list. If an author made their own list, it will show up in their own account as a list they made. If someone shares a list with someone else or if they accept a list made by someone else, the author name may remain and be different from the person using the list. For a given client, a collection of "shared lists" may be available separately from the collection of lists they made themselves. In some embodiments, the lists may be modified, renamed, reshared, etc., with the global list server 200 server keeping track of all of the transactions.

A client can playback a global list, thus using it as a playlist. For example, if the client saves several songs to a global list, the global list can be played and would play the songs in that global list. The songs can play in the order they're represented on the global list, randomly, or according to any other criteria.

The items on the global list can be any type of media (e.g., pointers to audio files, images, videos, web pages, documents, locations, etc.). During playback, different types of media may be played back in programmable ways. For example, a video can play, followed by several images being presented, followed by another video playing and then a web page loading. The media items can also be programmed to play at overlapping times according to some programmable scheme. For example, a global list can play audio while it displays images.

The global list can be available in any app that is configured to connect with global list server 200 for transacting business related to saving, editing and accessing these global lists. Generally, apps made with global list server 200 will contain the capability. A plug-in or widget may be available to other app developers who wish to incorporate this functionality into their apps. Other developers could also write their own code to enable this functionality.

The present disclosure provides methods and tools to make apps more interconnected. With websites, clients can effortlessly click hyperlinks and move from one website to another or from one piece of content on the web to another. Clients can also bookmark web pages or content items that exist anywhere on the web from a place like their browser and then quickly access that web page or content item from their bookmark.

This method of operation is not currently feasible with apps, making apps more like "islands" whereas web pages are more connected.

One extended capability resulting from global lists is that clients can effectively navigate from one app to another app without necessarily leaving the first app or noticing the requirement to download the second app. This is because the first app can access a media item that can effectively be another app entirely or a substantial enough part of it that the client experiences an effect resembling having moved into another app. Alternatively, the client may only access a small portion of a second app (e.g., the portion that the client cares about) and therefore no longer be bothered with navigating into a second app where there is little interest. In some embodiments, the client would only download the part of the other app that they care about, e.g. a piece of content and/or functionality, rather than the entire other app, thus making their experience quicker also, as the mobile device can do less downloading and less processing to get the client to the piece of content and/or functionality that they want to access. An example of such a case is where a client has downloaded the app of a music artist's entire album, but only cares for one song on the album.

By globally tracking media items and/or global lists, the present disclosure provides methods and tools that can also track which content items become popular among clients. This data can be used in many ways, for example in providing a leader board ranking and/or providing quick access to popularly media items (or accessed, etc.) content and/or functionality from separate apps.

The present disclosure provides methods and tools that can also create a community around clients' media items, letting people comment on media items, or items of content even if they aren't media items. This is a kind of social media hybrid. For example, a client can comment on a media item in the global list. The client may then have the option of pushing that comment out using social media tools such as Twitter.

The client could link their global list account to other services, such as Facebook, Twitter, MailChimp, etc. and configure their accounts with those services in advance to be automatically accessible from their e.g. global list accounts so they can e.g. post their activity via the global list button or apps with global list database 210 to those external services. Clients could, e.g. follow clients on Twitter or Facebook or sign-up for a mailing list on MailChimp simply by clicking one button to perform that action and not needing to log in to those third party services each time. In this use, the global list button/library functions like a Global Keychain to allow the client quick access, e.g. no repeated third party logins required, to interact and interface with third party services, sometimes even automatically.

The client could favorite media items on a list to create a schedule of events. Clients can also check-into events via the global list button/library and store, share and use these similarly globally.

The global list button/database could also manage the purchasing of tickets in apps.

A client may also donate to apps or spend currency in apps that is managed globally by the global list button/library services. For example, the client could establish banking information with their global list account such that they can quickly and easily click a button within an app that uses the global list button and it would exchange information between the parties (app owner and client or other) to transact currency in some direction among the parties. This could be for the client to pay money to get something from the app or even to receive money from something in the app. For example, the client could spend or earn money during game play. This could be in a standard currency, like US dollars, or it could be in any other currency. An exchange rate between Roovies and other currencies can be used. Viewing content or accessing features may cost Roovies. Performing actions may gain an entity Roovies.

Clients could make donations to apps on a donation wall. They would buy virtual items that represent their amount or range of giving. This could be similar to how within a building at e.g., a university there is a plaque that lists donors names with titles for their different levels of contribution, e.g. benefactor, trustee, gold circle, etc. The total amount of donations and breakdown of donations to different apps in different amounts could be tracked globally via e.g. this global list service. Rewards points could be established globally for various quantities or other characteristic of donation, spend, income or other characteristic or metric.

In some embodiments, the global list service may be used to uniquely point to one or more specific pieces of content in a app by the client supplying a unique identifier that points to that content that can be: a number or other code entered, manipulating the input device in some way, scanning a QR code, scanning a picture or taking a picture of something that represents a unique identifier, leveraging a location, etc.

In some embodiments, a client may use the global list service to follow a pod, app or another client or app author (who are also clients). From within any app or pod using this service, the client can subscribe to updates and see the latest content or other items that have been added to other apps that they have followed.

Different follower types can also be established for each global list. For example, if you have an app or a pod that is for a school class, students can follow the global list (or pod) as a student or as an observer and the teacher can establish and maintain the global list. Different rules can be established with different follower types. For example, if a client follows as a student rather than an observer, the system can send assignments to the client, begin collecting a record of grades of performance, etc. Also, from an integrated home screen, or from within any app using the global list service, a client can observe an aggregated view of various types of update data from a multitude of apps. For example, if a client is a student in two apps, they can see one view with the assignments due from both. Any data related to the assignments can also be displayed.

Metrics can also be tracked across one or more apps. Clients can apply global preferences for following rules that can then automatically apply in different apps for them. For example, metrics can include how many times various content from a list is accessed, the user name of the user accessing the list, where the user is that is requesting the media list. Another metric, for example, could be how many times a particular content item is added to any favorites list in the system.

Developers of apps can monitor the followers of their apps and view all metrics associated with these clients. Those who follow a app can be like subscribers to the app from the perspective of the author of that app.

The global list service can also be used to store client preferences for how a client prefers to interact with content or functionality in an app globally. For example, if a client likes to view all fonts in Arial 10 pt, that client can save this setting in their global list service and then whenever that client logs in to their global list account within a app, the app can interface with the settings preferences to alter the view or functionality according to those preferences and, for example, present the font as Arial 10 pt. Another example is to manage access privileges, for example, tracking a client's age or language and only presenting appropriate content for the client's age or in their language. Read/write or other interaction preferences for apps may also be maintained globally using the global list button service/library. Any type of settings may be stored via the server (or plurality of servers) that can be retrieved and used in different apps.

Media content aggregated from a plurality of apps can be displayed in a system external to any single app. For example, a website, an app, or any other aggregation destination, can be maintained that presents all or part of the content or functionality from different apps according to any selection criteria, e.g. most popular, most favorite, by topic, etc. This can be achieved because the content or functionality and/or links to it and possibly necessary supporting data are stored external to any single app.

Clients may also add links to content, functionality, web pages, sites or other items, external to the global list service or any application or service that runs, supports or interfaces with e.g. the global list service or something substantially similar to their global lists. For example, a URL or any pointer or reference to anything could be added on a list. These can be added manually or automatically, one at a time or in batch, and from inside or outside of the service. For example, a tool could be created to import a client's browser bookmarks (or bookmarks from other services) into their global lists. Then these items can also be accessed from the global list service. This could also be implemented in other websites or desktop applications or appliances, etc.

In some embodiments, a tool can be used to operate external to this service, e.g. in a client's web browser (or another application or appliance) that would allow the client to access their global lists and associated content, functionality, lists, media, etc. This may be similar to having a global list button in, for example, a web browser, desktop, operating system, computer, phone, PDA, tablet, via a button on a cell phone or other computing device, within a desktop application, on a refrigerator, television, etc.

Clients can rate media content. Global list server 200 can aggregate ratings and/or leverage information. For example, similar to the commenting noted above, a client may rate media content or a global list via a numerical or iconic rating system (e.g., thumbs up or down) in the global list. The client may then have the option of pushing that rating out using social media tools such as Twitter, Facebook, LinkedIn, etc.

In some embodiments, an App or server may allow clients to locally cache or store information from a global list, such as a global list, Favorites List (and/or the content or functionality that it points to), media content, links to media content, etc. For example, media content listed in a global list may be downloaded onto the device executing the App. In some embodiments, an app or widget may include an option to download media content in real-time (e.g., a "download now" type of button) and/or automatically download media content that stores the content locally. In some cases, media content can be played back as it downloads.

In some embodiments, the tools describe herein relate to using a global list(s). Such global lists may include standalone portions or components, such as Favorite Lists, global list, Global Ratings, and Global Comments. A benefit of using the tools described herein is that a client can manage all of his apps' content using more of a global format provided by his global list account. Additionally, the ability to utilize the apps' content and participate in analyzing the content, e.g., by commenting or rating, using the global format and optionally with available social media tools such as Twitter, Facebook, etc. is a powerful and effective way for clients to manage their apps.

Figure 6:
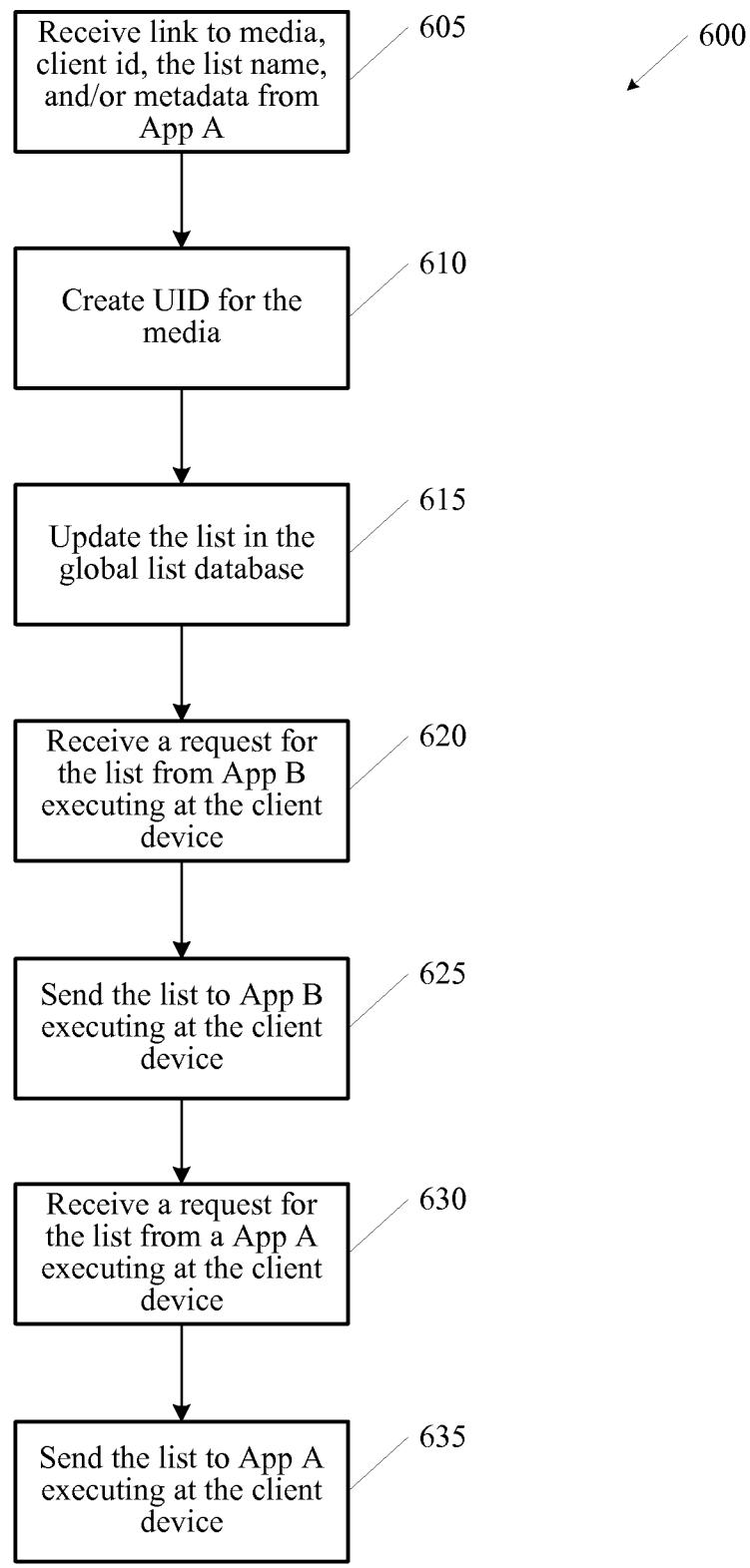
FIG. 6 is a flowchart of a process for adding media to a global list database according to some embodiments of the invention.

In some embodiments, a client can interface with global list server 200 and/or access media on global list database 210 in any number of ways. FIG. 6 is a flowchart of one example of process 600 for adding media to global list database 210. Process 600 can be executed, for example, by global list server 200. Process 600 can start at block 605 where a message is received from App A executing at a client device. The message can specify the media to be added to the database. The message can be organized in a number of ways. For example, the message can include headers indicating that media is being added to the global list database. Various other data elements of the header can be included. The message may also include a payload with various data elements that may include a link to location where the media can be viewed, a username, an indication of a list within which the media should be organized, and/or metadata. As one example, the link to the data can be www.photos.com/photo1, the username can be Client 1, and the list can be List A. The message can be received from a client that may include a computer, mobile phone, and/or tablet. In some embodiments, the message can be an HTTP POST request.

In some embodiments, the message payload may include media instead of a link to media. In such embodiments, the media may be stored in global list database 210 or in another network accessible server. Then the link to the media in global list database 210 on in the network accessible server may be used.

At block 610, process 600 can create a unique identifier (UID) such as, for example, a universally unique identifier (UUID). The UID can provide a unique identifier to the media that can be easily coordinated with clients (e.g., apps or applications). The UID can be determined using any number of algorithms known in the art. In some embodiments, the UID can be created by global list server 200 and assigned to the media. In some embodiments, the client device can create the UID and assign it to the media prior to sending it to global list server 200.

At block 615 the list indicated in the message that is stored in global list database 210 can be updated with the link to the media, the UID, the username, and/or any other data or metadata associated with the media. Any type of database management technique(s) can be used to store the data in global list database 210. In the example noted above, List A can be updated to include the newly created UID; the link, www.photos.com/photo1; and username, Client 1.

In some embodiments, List A can be published to various Apps that have requested notification that List A has been updated. For instance, App C executing on a client device may request to be notified when List A is updated and/or modified. In response to this addition of media to List A, a notification can be sent to App C alerting the App that new media is available for App A. App C may or may not download the media in response to receiving the notification.

At block 620 a request for List A can be received from App B executing on the same or a different client device as App A. That is, the media stored in List A can now be requested from App B. In this embodiment, App A and App B are independent and/or different applications that both interface with global list database 210 and neither application is a web browser. The request can include the list ID and/or the username. In the example noted above, the request can include the list ID, List A; and/or username, Client 1. In response, at block 625 the list can be sent to App B executing on the client device.

In some embodiments, the request noted in block 620, may include various authentication tokens, and/or passwords, etc. to ensure that the proper client is requesting the list. In other embodiments, some lists may be public so authentication tokens and/or passwords may not be used. In some embodiments, the request can be an HTTP GET request.

At block 630 a request can be made for the list from App A. That is, the media stored in List A may also be requested from App A. The request can include the list ID and/or the username. In the example noted above, the request can include the list ID, List A; and/or username, Client 1. In response, at block 635 the list can be sent to App B executing on the client device. That is, List A can be sent to the client device. In some embodiments, the request can be an HTTP GET request.

In some embodiments, the request noted in block 620, may include various authentication tokens, and/or passwords, etc. to ensure that the proper client is requesting the list. In other embodiments, some lists may be public so authentication tokens and/or passwords may not be used.

Process 600 can be used to allow two apps executing on a client device to access, aggregate, and/or interface with media stored in global list database 210 organized as List A. Various other combinations can be considered. For example, other apps executing on the client device or on other client devices can access List A in global list database 210. As another example, a client can access List A in global list database via a web browser or other application executing on a computer or other device. As yet another example, App A and/or App B can access other lists stored in global list database 210 or in other databases.

In some embodiments, different clients can have different permissions. For example, App A can be used by a teacher to create List A and can allow the teacher to update, modify, change, organize, etc., List A. App B can be used by students to view media content in List A, but without being able to update, modify, change, organize, etc. List A. In some embodiments, students may be able to have some access to add or modify media content as specified by the teacher.

In some embodiments, a client may be required to login in order to access media in global list database 210. That is, the client may need to login into the global list service via both App A and App B prior to gaining access to the global list. Both App A and App B can include functionality provide via a software library, plugin or API to allow the client to login into the global list service.

Figure 7:
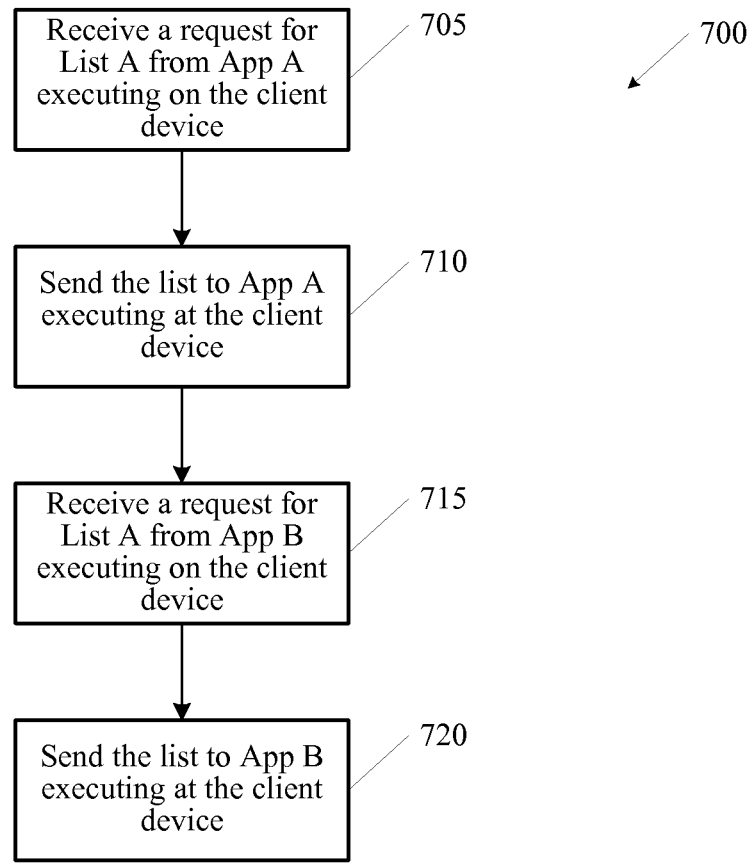
FIG. 7 is a flowchart of a process for providing access to a global list for two or more different apps according to some embodiments of the invention.

Two or more different, independent and/or dedicated apps executing on the same client device or different client devices can access the same global list as shown by process 700 shown in FIG. 7. The two or more different, independent and/or dedicated apps can be created by different app developers, created by different individuals, sold by a different group, execute on different client devices, executing on different operating systems, etc., and/or can be apps that are not web browser apps. Process 700 starts at block 705. Global list server 200 can receive a request for List A from App A executing on a client device. List A can be stored in global list database 210. In some embodiments, the request can be an HTTP GET request.

At block 710 global list server 200 can send List A to App A executing on the client device. This can be accomplished in any number of ways, for example, as described herein. At block 715 global list server 200 can receive a request for List A from App B executing on a client device. In some embodiments, the request can be an HTTP GET request. App B can be an app executing on the client device (or another client device) that is different from App A. That is, App B and App A can be created by different app developers, created by different individuals, sold by different groups, execute on different client devices, executing on different operating systems, etc.

At block 720 global list server 200 can send List A to App B executing on the client device. This can be accomplished in any number of ways, for example, as described herein. In this way, media content found in List A can be accessed by two different apps.

Figure 8:
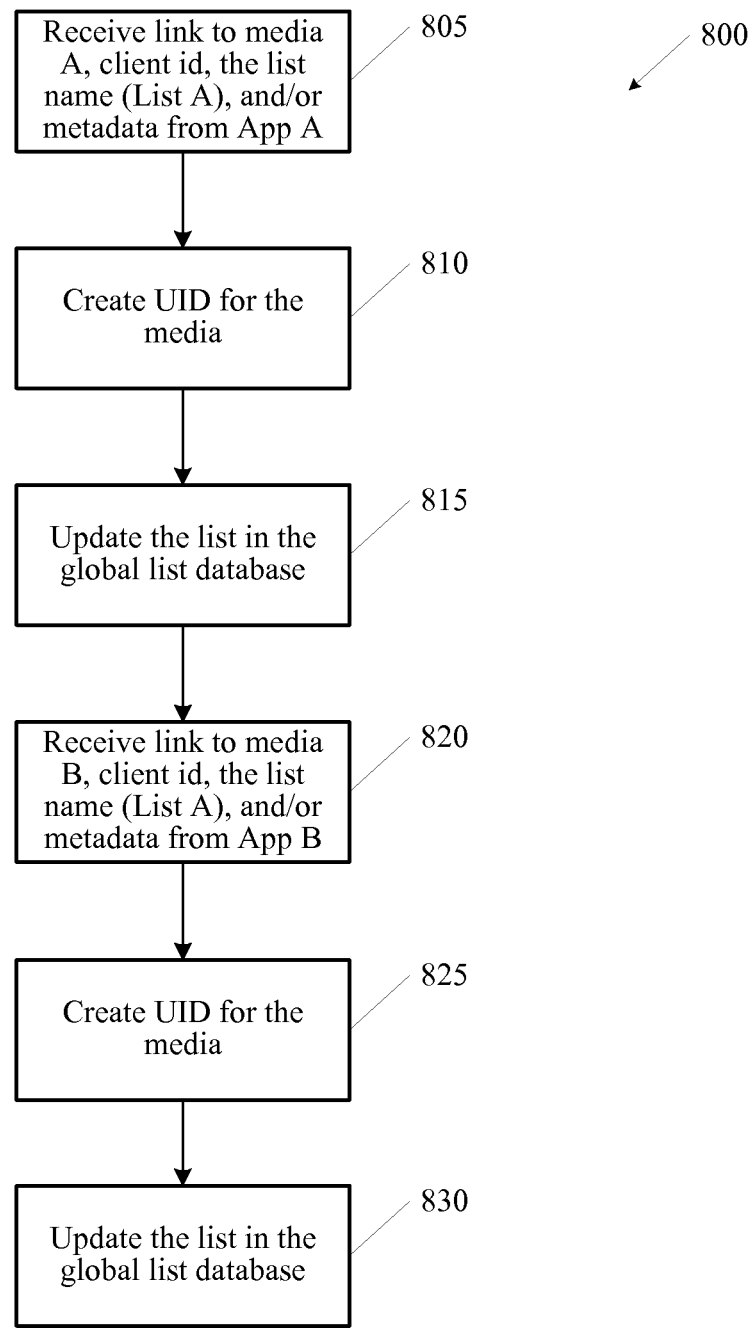
FIG. 8 is a flowchart of a process for adding media to a global list from two or more different apps according to some embodiments of the invention.

In some embodiments, two or more different apps can also add media to a global list as shown process 800 outlined in the flowchart shown in FIG. 8. The two or more different apps can be created by different app developers, created by different individuals, sold by a different group, execute on different client devices, executing on different operating systems, etc. Process 800 can be executed, for example, by global list server 200.

Process 800 starts at block 805 where a message is received from App A executing at a client device. The message can specify the media to be added to the database. The message can be organized in a number of ways. For example, the message can include headers indicating that media is being added to the global list database. Various other data elements of the header can be included. In some embodiments, the message can be an HTTP POST request. The message may also include a payload with various data elements that may include a link to location where the media can be viewed, a username, an indication of a list within which the media should be organized, and/or metadata. As one example, the link to the data can be www.photos.com/photo1, the username can be Client 1, and the list can be List A. The message can be received from a client that may include a computer, mobile phone, and/or tablet.

In some embodiments, the message payload may include media instead of a link to media. In such embodiments, the media may be stored in global list database 210 or in another network accessible server. Then the link to the media in global list database 210 on in the network accessible server may be used.

At block 810, process 800 can create a unique identifier (UID) such as, for example, a universally unique identifier (UUID). The UID can provide a unique identifier to the media that can be easily coordinated with clients (e.g., apps or applications). The UID can be determined using any number of algorithms known in the art. In some embodiments, the UID can be created by global list server 200 and assigned to the media. In some embodiments, the client device can create the UID and assign it to the media prior to sending it to global list server 200.

At block 815 the list indicated in the message that is stored in global list database 210 can be updated with the link to the media, the UID, the username, and/or any other data or metadata associated with the media. Any type of database management technique(s) can be used to store the data in global list database 210. In the example noted above, List A can be updated to include the newly created UID; the link, www.photos.com/photo1; and username, Client 1.

Process 800 can then receive an update from App B executing on the client device or on another client device. At block 820 a message is received from App B executing at a client device. The message can specify the media to be added to the database. The message can be organized in a number of ways. For example, the message can include headers indicating that media is being added to the global list database. Various other data elements of the header can be included. The message may also include a payload with various data elements that may include a link to location where the media can be viewed, a username, an indication of a list within which the media should be organized, and/or metadata. In some embodiments, the message can be an HTTP POST request. As one example, the link to the data can be www.photos.com/photo1, the username can be Client 1 (or a different client), and the list can be List A. The message can be received from a client that may include a computer, mobile phone, and/or tablet.

In some embodiments, the message payload may include media instead of a link to media. In such embodiments, the media may be stored in global list database 210 or in another network accessible server. Then the link to the media in global list database 210 on in the network accessible server may be used.

At block 825, process 800 can create a unique identifier (UID) such as, for example, a universally unique identifier (UUID). The UID can provide a unique identifier to the media that can be easily coordinated with clients (e.g., apps or applications). The UID can be determined using any number of algorithms known in the art.

At block 830 the list indicated in the message that is stored in global list database 210 can be updated with the link to the media, the UID, the username, and/or any other data or metadata associated with the media. Any type of database management technique(s) can be used to store the data in global list database 210. In the example noted above, List A can be updated to include the newly created UID; the link, www.photos.com/photo1; and username, Client 1.

Figure 9:
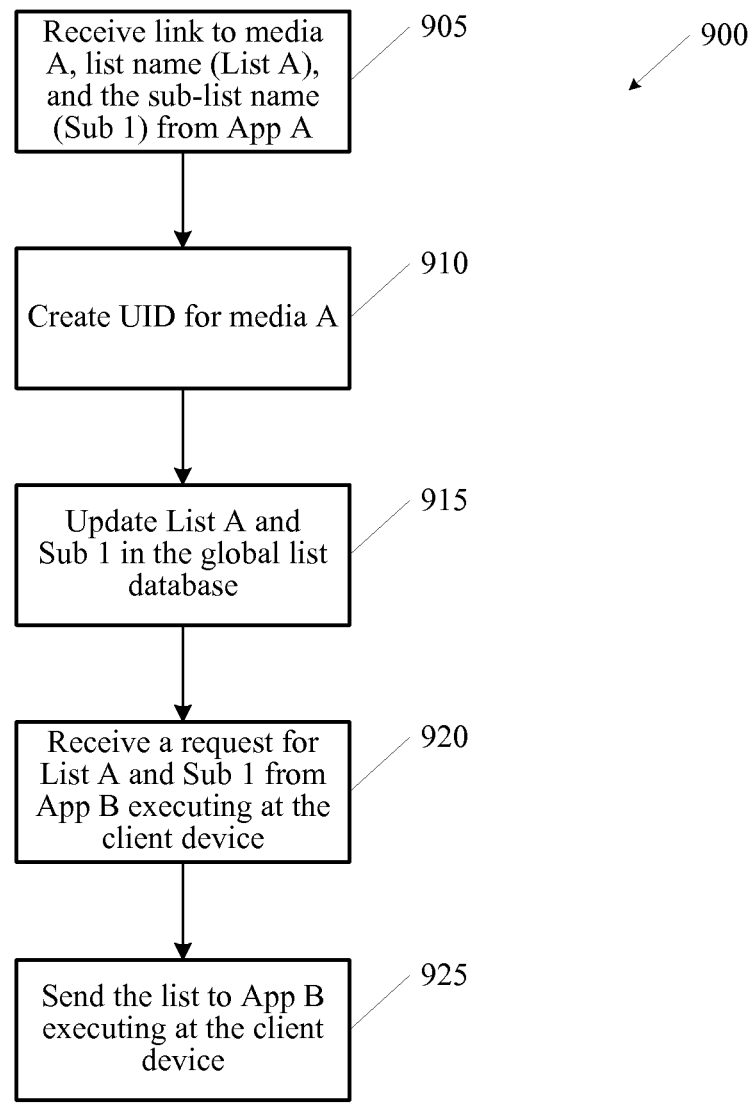
FIG. 9 is a flowchart of a process for organizing and sharing content in sub lists according to some embodiments of the invention.

In some embodiments, a global list can be organized into sub lists. A sub list can, for example, be an album for photographs or music, a collection of videos, chapters of a book, segments of a course, collections based on content type, or any other collection of content. Process 900 shown in the flowchart in FIG. 9 is one method for organizing and sharing content in sub lists according to some embodiments of the invention.

Process 900 can start at block 905 where a message is received from App A executing at a client device. The message can specify the media to be added to the database. The message can be organized in a number of ways. For example, the message can include headers indicating that media is being added to the global list database. Various other data elements of the header can be included. The message may also include a payload with various data elements that may include a link to location where the media can be viewed, a username, an indication of a list within which the media should be organized, an indication of one or more sub lists of where the media should be organized, and/or metadata. In some embodiments, the message can be an HTTP POST request. As one example, the link to the data can be www.photos.com/photo1, the username can be Client 1, the list can be List A, and the sub list can be Sub 1. The message can be received from a client that may include a computer, mobile phone, and/or tablet.

In some embodiments, the message payload may include media instead of a link to media. In such embodiments, the media may be stored in global list database 210 or in another network accessible server. Then the link to the media in global list database 210 on in the network accessible server may be used.

At block 910, process 900 can create a unique identifier (UID) such as, for example, a universally unique identifier (UUID). The UID can provide a unique identifier to the media that can be easily coordinated with clients (e.g., apps or applications). The UID can be determined using any number of algorithms known in the art. In some embodiments, the UID can be created by global list server 200 and assigned to the media. In some embodiments, the client device can create the UID and assign it to the media prior to sending it to global list server 200.

At block 915 the list (List A) and the sub list (Sub 1) indicated in the message that is stored in global list database 210 can be updated with the link to the media, the UID, the username, and/or any other data or metadata associated with the media. Any type of database management technique(s) can be used to store the data in global list database 210. In the example noted above, List A and/or Sub 1 can be updated to include the newly created UID; the link, www.photos.com/photo1; and username, Client 1.

At block 920 a request can be made for List A and Sub 1 from App B executing on the same or a different client device as App A. That is, the media stored in List A and Sub 1 can be requested by App B. In this embodiment, App A and App B are different and/or independent applications (and neither is a web browser) that can interface with global list database 210. The request can include the list ID, the sub list ID and/or the username. In the example noted above, the request can include the list ID, List A; Sub list ID, Sub 1; and/or username, Client 1. In some embodiments, the request can be an HTTP GET request. In response, at block 925 the list can be sent to App B executing on the client device. That is, List A can be sent to the client device.

Figure 10:
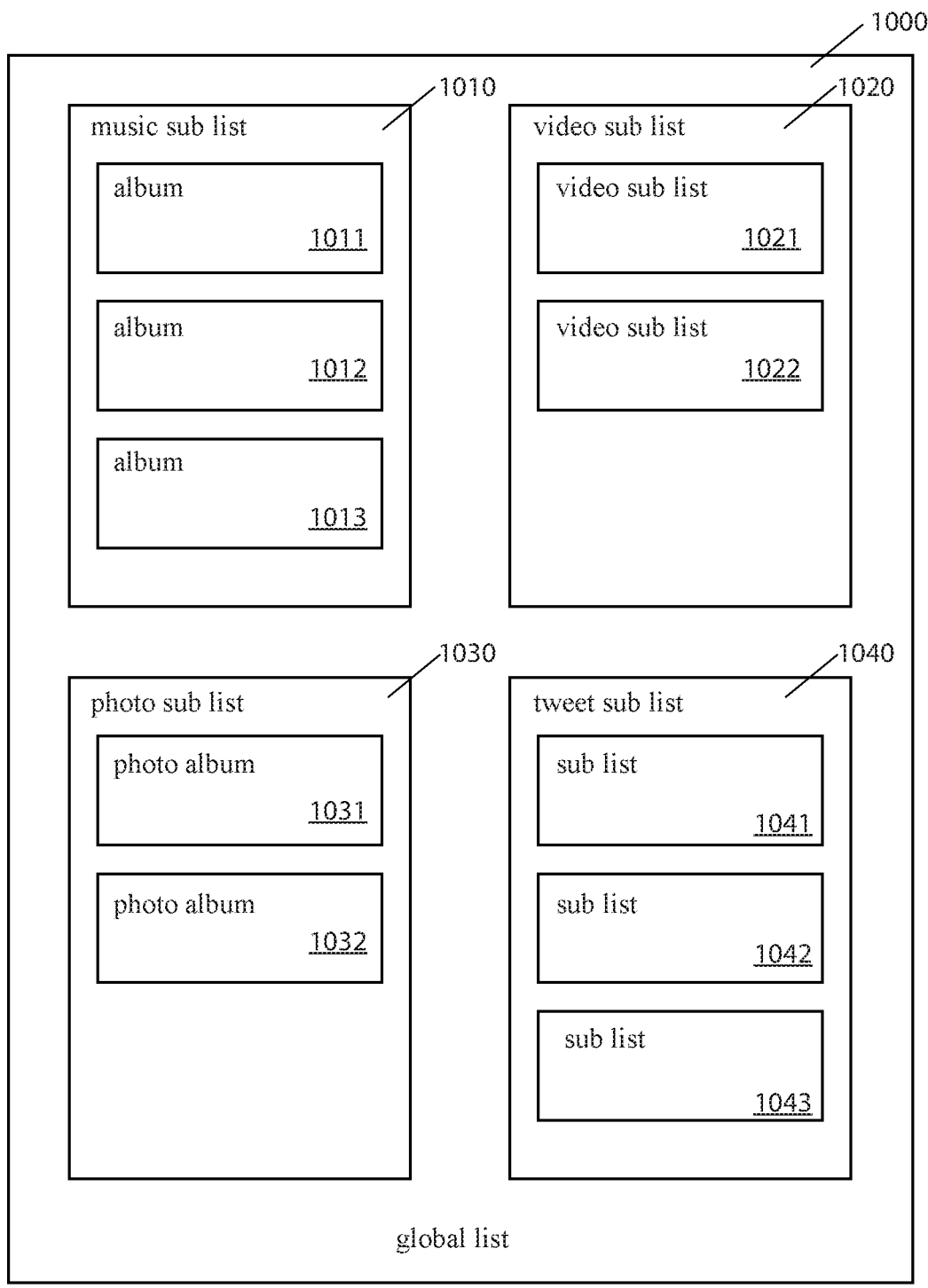
FIG. 10 is a block diagram of a sub list structure for a global list according to some embodiments of the invention.

In some embodiments the owner of a global list can determine which users have access to various sub lists within the global list. Moreover, the owner of the global list or a specified delegate of the owner can organize media in one or more sub lists. In some embodiments, multiple levels of sub lists may be used. For example, as shown in FIG. 10, global list 1000, can include four top level sub lists: music sub list 1010, video sub list 1020, photo sub list 1030 and tweet sub list 1040. Music sub list 1010 can include three sub lists: album 1011, album 1012, and album 1013. Each album may include any number and/or type of music or further sub lists. Video sub list 1020 can include video sub list 1021 and video sub list 1022. Each sub list may include any number and/or type of video or further sub lists. Photo sub list 1030 can include two sub lists: photo album 1031 and photo album 1032. Each photo album may include any number and/or type of photographs or further sub lists. Tweet sub list 1040 can include sub list 1041, sub list 1042 and sub list 1043. Each sub list may include any number and/or type of tweets or further sub lists.

Under this definition, for example, the safari web browser operating on a computer (e.g., a Mac) is not different than the safari web browser operating on a hand held device (e.g., an iPhone, iPod, or iPad). Similarly, the chrome web browser operating on a computer is not different than a chrome web browser operating on a hand held device.

Media can comprise any type of digital content. For example, media may include music, videos, photographs, images, webpages, tweets, sheet music, lessons, books, documents, spreadsheets, workbooks, worksheets, slideshows, power point presentations, pdfs, presentations, blogs, feeds, articles, contacts, events, calendar items, etc.

Figure 11:
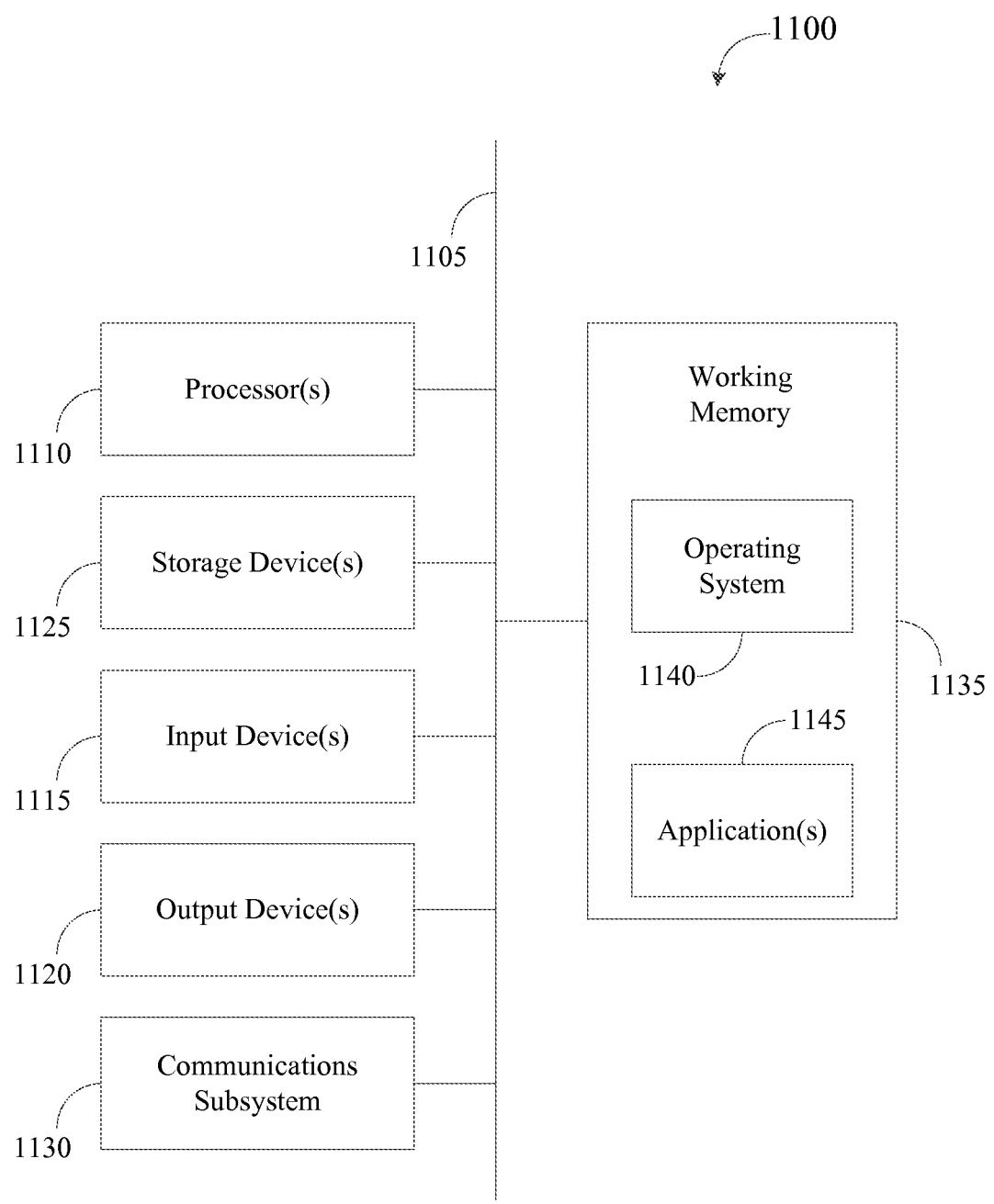
FIG. 11 shows an illustrative computational system for performing functionality to facilitate implementation of embodiments described herein.

The computational system 1100, shown in FIG. 11 can be used to perform any of the embodiments of the invention. For example, computational system 1100 can be used to execute processes 400, 500, 600, 700, 800 and/or 900. As another example, computational system 1100 can be used perform any calculation, identification and/or determination described here. Moreover, global list server 200 and/or global list database may comprise a computational device similar to or like computational system 1100.

Computational system 1100 includes hardware elements that can be electrically coupled via a bus 1105 (or may otherwise be in communication, as appropriate). The hardware elements can include one or more processors 1110, including without limitation one or more general-purpose processors and/or one or more special-purpose processors (such as digital signal processing chips, graphics acceleration chips, and/or the like); one or more input devices 1115, which can include without limitation a mouse, a keyboard and/or the like; and one or more output devices 1120, which can include without limitation a display device, a printer and/or the like.

The computational system 1100 may further include (and/or be in communication with) one or more storage devices 1125, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1100 might also include a communications subsystem 1130, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 1130 may permit data to be exchanged with a network (such as the network described below, to name one example), and/or any other devices described herein. In many embodiments, the computational system 1100 will further include a working memory 1135, which can include a RAM or ROM device, as described above.

The computational system 1100 also can include software elements, shown as being currently located within the working memory 1135, including an operating system 1140 and/or other code, such as one or more application programs 1145, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1125 described above.

In some cases, the storage medium might be incorporated within the computational system 1100 or in communication with the computational system 1100. In other embodiments, the storage medium might be separate from a computational system 1100 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1100 and/or might take the form of source and/or installable code, which, upon compilation and/or installation on the computational system 1100 (e.g., using any of a variety of generally available compilers, installation programs, compression/decompression utilities, etc.) then takes the form of executable code.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method executing on a global list server, the method comprising:
   obtaining a first message via a wireless communication network, the first message being sent from a first client app executing on a mobile client device, the first message comprising:
      a first media link that points to an image, music, or a video stored on a first server,
      a first user identifier,
      a first identifier associated with the first client app, and
      an indication of a first media index where the first media link will be stored, the first media index being associated with the first user identifier, and wherein the first media index comprises a first plurality links to a first plurality of media;
   organizing the first media link in the first media index in a database associated with a global list server;
   obtaining a second message via a wireless communication network, the second message being sent from the first client app executing on the mobile client device, the second message comprising:
      a second media link that points to an image, music, or a video stored on a second server,
      the first user identifier,
      the first identifier associated with the first client app, and
      an indication of a second media index where the second media link will be stored, the second media index being associated with the first user identifier, and wherein the second media index comprises a second plurality links to a second plurality of media;
   organizing the second media link in the second media index in the database;
   obtaining a third message via a wireless communication network, the third message being sent from a second client app executing on the mobile client device, the second client app being a different executable application than the first client app and executing on the same mobile client device, neither the first client app nor the second client app comprise a web browser, the third message comprising:
      the first user identifier,
      a second identifier associated with the second client app, and
      a request for one or more media indexes associated with the first user identifier; and
   directing the one or more media indexes associated with the first user identifier to the second client app executing on the mobile client device.

2. The method according to claim 1, further comprising creating a unique identifier for the media associated with the first media link, and associating the unique identifier with the first media link in the media index.

3. The method according to claim 1, further comprising:
obtaining metadata associated with the media from the first client app; and
organizing the metadata with the media in the media index in the database.

4. The method according to claim 1, further comprising:
obtaining an indication of the order of the first media link relative to other media links in the media index; and
wherein organizing the first media link in the media index in the database further comprises: organizing the first media link in an order relative to other media links in the media index as specified by the indication of the order of the first media.

5. The method according to claim 1, further comprising receiving a request from the first client app executing on the mobile client device to create the media index prior to receiving the first media link.

6. The method according to claim 1, further comprising:
determining a plurality of clients associated with the media index; and
directing the media index to the plurality of clients associated with the media index.

7. The method according to claim 1, further comprising:
determining a plurality of clients associated with the media list; and
directing an indication associated with the media index to the plurality of clients associated.

8. The method according to claim 1, wherein the media index includes a media sub-list, and wherein the organizing the media into the media index includes organizing the media into the media sub-list.

9. The method according to claim 1, wherein directing the one or more media indexes associated with the first user identifier to the second client app executing on the mobile client device comprises wirelessly communicating the one or more media indexes associated with the first user identifier to the second client app executing on the mobile client device.

10. A global list server comprising:
a database;
a communication interface; and
a processor communicatively coupled with the database and the communication interface, wherein the processor is configured to;
obtain a first message via a wireless communication network, the first message being sent from a first client app executing on a mobile client device, the first message comprising:
a first media link that points to an image, music, or a video stored on a first server,
a first user identifier,
a first identifier associated with the first client app, and
an indication of a first media index where the first media link will be stored,
the first media index being associated with the first user identifier, and wherein
the first media index comprises a first plurality links to a first plurality of media;
organize the first media link in the first media index in the database; obtain a second message via a wireless communication network, the second message being sent from the first client app executing on the mobile client device, the second message comprising:
a second media link that points to an image, music, or a video stored on a second server,
the first user identifier,
the first identifier associated with the first client app, and
an indication of a second media index where the second media link will be stored, the second media index being associated with the first user identifier, and wherein the second media index comprises a second plurality links to a second plurality of media;
organize the second media link in the second media index in the database;
obtain a third message via a wireless communication network, the third message being sent from a second client app executing on the mobile client device, the second dent app being a different executable application than the first dient app and executing on the same mobile client device, neither the first client app nor the second client app comprise a web browser, the third message comprising:
the first user identifier,
a second identifier associated with the second client app, and
a request for one or more media indexes associated with the first user identifier; and
direct the one or more media indexes associated with the first user identifier to the second client app executing on the mobile client device.

11. The global list server according to claim 10, wherein the processor is further configured to create a unique identifier for the media associated with the first media link, and associating the unique identifier with the first media link in the media index.

12. The global list server according to claim 10, wherein the processor is further configured to
obtain metadata associated with the media from the first client app; and
organize the metadata with the media in the media index in the database.

13. The global list server according to claim 10, wherein the processor is further configured to:
obtain an indication of the order of the first media link relative to other media links in the media index; and
wherein organizing the first media link in the media index in the database further comprises: organizing the first media link in an order relative to other media links in the media index as specified by the indication of the order of the first media.

14. The global list server according to claim 10, wherein the processor is further configured to receive a request from the first client app executing on the mobile client device to create the media index prior to receiving the first media link.

15. The method according to claim 10, wherein the processor is further configured to:
determine a plurality of clients associated with the media index; and
direct the media index to the plurality of clients associated with the media index.

16. The global list server according to claim 10, wherein the processor is further configured to:
determine a plurality of clients associated with the media list; and
direct an indication associated with the media index to the plurality of clients associated.

17. The global list server according to claim 10, wherein the media index includes a media sub-list, and wherein the organizing the media into the media index includes organizing the media into the media sub-list.

18. The global list server according to claim 10, wherein the one or more media indexes associated with the first user identifier is wirelessly directed to the second client app executing on the mobile client device.

\* \* \* \* \*